US012591572B2

(12) United States Patent
Labbate et al.

(10) Patent No.:  US 12,591,572 B2
(45) Date of Patent:  Mar. 31, 2026

(54) OPTIMIZING SPARQL QUERIES IN A DISTRIBUTED GRAPH DATABASE

(71) Applicant: DASSAULT SYSTEMES, Vélizy-Villacoublay (FR)

(72) Inventors: Frédéric Labbate, Vélizy-Villacoublay (FR); Jean-Philippe Sahut D'izarn, Vélizy-Villacoublay (FR); Alban Roullier, Vélizy-Villacoublay (FR); David Edward Tewksbary, Waltham, MA (US)

(73) Assignee: DASSAULT SYSTEMES, Vélizy-villacoublay (FR)

( * ) Notice: Subject to any disclaimer, the term of this patent is extended or adjusted under 35 U.S.C. 154(b) by 0 days.

(21) Appl. No.: 18/067,848

(22) Filed: Dec. 19, 2022

(65) Prior Publication Data

US 2023/0195725 A1    Jun. 22, 2023

(30) Foreign Application Priority Data

Dec. 17, 2021    (EP) ..................................... 21306834

(51) Int. Cl.
*G06F 16/2453*        (2019.01)
*G06F 16/2455*        (2019.01)
*G06F 16/901*         (2019.01)

(52) U.S. Cl.
CPC .. *G06F 16/24537* (2019.01); *G06F 16/24565* (2019.01); *G06F 16/9024* (2019.01)

(58) Field of Classification Search
None
See application file for complete search history.

(56) References Cited

U.S. PATENT DOCUMENTS

2009/0138498 A1*  5/2009  Krishnamoorthy .......................... G06F 16/2452
2012/0066205 A1*  3/2012  Chappell ........... G06F 16/24535 707/E17.131

(Continued)

FOREIGN PATENT DOCUMENTS

| CN | 109710638 A | 5/2019 |
| CN | 110825738 A | 2/2020 |
| EP | 3 267 330 A1 | 1/2018 |

OTHER PUBLICATIONS

Shironoshita, E. Patrick, et al. "semQA: SPARQL with Idempotent Disjunction." IEEE transactions on knowledge and data engineering 21.3 (2008): 401-414. (Year: 2008).*

(Continued)

*Primary Examiner* — Umar Mian

(74) *Attorney, Agent, or Firm* — Oblon, McClelland, Maier & Neustadt, L.L.P.

(57) ABSTRACT

A computer-implemented method for generating by a query engine a graph of operators for a SPARQL query over an RDF graph. The method includes obtaining a graph of operators executable by the query engine, the graph comprising a plurality of basic operators, at least two of said operators being of a first type each configured to find RDF triples of the RDF graph that match a respective basic graph pattern. The method further comprises identifying a group of operators among the at least two basic operators of the graph which are of the first type. The respective basic graph patterns of the group of operators have same subject and/or predicate and/or object and the identified group of operators is replaced in the graph by an equivalent operator configured to find RDF triples of the RDF graph that match the respective basic graph patterns of the group of operators.

19 Claims, 6 Drawing Sheets

(56) References Cited

U.S. PATENT DOCUMENTS

| | | | | |
|---|---|---|---|---|
| 2012/0136875 A1* | 5/2012 | Pan | .................... | G06F 16/953 |
| | | | | 707/E17.014 |
| 2013/0262443 A1* | 10/2013 | Leida | ............... | G06F 16/24534 |
| | | | | 707/E17.014 |
| 2014/0067793 A1* | 3/2014 | Shironoshita | ..... | G06F 16/24526 |
| | | | | 707/718 |
| 2014/0304251 A1* | 10/2014 | Bornea | ............... | G06F 16/9024 |
| | | | | 707/718 |
| 2019/0310840 A1* | 10/2019 | Dufresne | ................ | G06N 5/00 |
| 2021/0073226 A1 | 3/2021 | Chavan et al. | | |

OTHER PUBLICATIONS

Loshin, Peter. "Definition: Resource Description Framework (RDF)." Published by TechTarget.com in Feb. 2022. Accessed Jul. 11, 2024 from https://www.techtarget.com/searchapparchitecture/definition/Resource-Description-Framework-RDF (Year: 2022).*

DuCharme, Bob. "What is RDF?" Published Jun. 27, 2021. Accessed Jul. 11, 2024 from https://www.bobdc.com/blog/whatisrdf/ (Year: 2021).*

Peng, Peng, et al. "Processing SPARQL queries over distributed RDF graphs." The VLDB Journal 25.2 (2016): 243-268. (Year: 2016).*

Peng, Peng, Zou, Lei, Özsu, M. Tamer, et al. Processing SPARQL queries over distributed RDF graphs. The VLDB Journal, 2016, vol. 25, No. 2, p. 243-268.

Taft, Rebecca, Sharif, Irfan, Matei, Andrei, et al. Cockroachdb: The resilient geo-distributed SQL database. In: Proceedings of the 2020 ACM SIGMOD International Conference on Management of Data. 2020. p. 1493-1509.

Kersten, Timo, Leis, Viktor, Kemper, Alfons, et al. Everything you always wanted to know about compiled and vectorized queries but were afraid to ask. Proceedings of the VLDB Endowment, 2018, vol. 11, No. 13, p. 2209-2222. -vectorization2/p2209-kersten.pdf.

"RDF 1.1 Concepts and Abstract Syntax", W3C Recommendation Feb. 25, 2014, online, https://www.w3.org/TR/rdf11-concepts/.

"SPARQL 1.1 Query Language", W3C Recommendation Mar. 21, 2013, online, https://www.w3.org/TR/sparql11-query/, accessed May 12, 2021.

"The Open World Assumption or Sometimes its nice to know what we don't know", Nick Drummond and Rob Shearer, The University of Manchester online course, http://www.cs.man.ac.uk/~drummond/presentations/OWA.pdf.

Álvarez-García, Sandra, Brisaboa, Nieves, Fernández, Javier D., et al. Compressed vertical partitioning for efficient RDF management. Knowledge and Information Systems, 2015, vol. 44, No. 2, p. 439-474.

Amarnath Gupta et al: "On Querying OBO Ontologies Using a DAG Pattern Query Language", Jan. 1, 2006 (Jan. 1, 2006), Data Integration in the Life Sciences Lecture Notes in Computer Science;Lecture Notes in Bioinformatics;LNCS, Springer, Berlin, DE, pp. 152-167, XP019037222.

The extended European search report mailed Jun. 1, 2022 in corresponding European Patent Application No. 21306834.9 (14 pages).

Office Action dated Jul. 14, 2025, issued in counterpart EP Application No. 21306834.9, citing document No. 1. (12 pages).

* cited by examiner

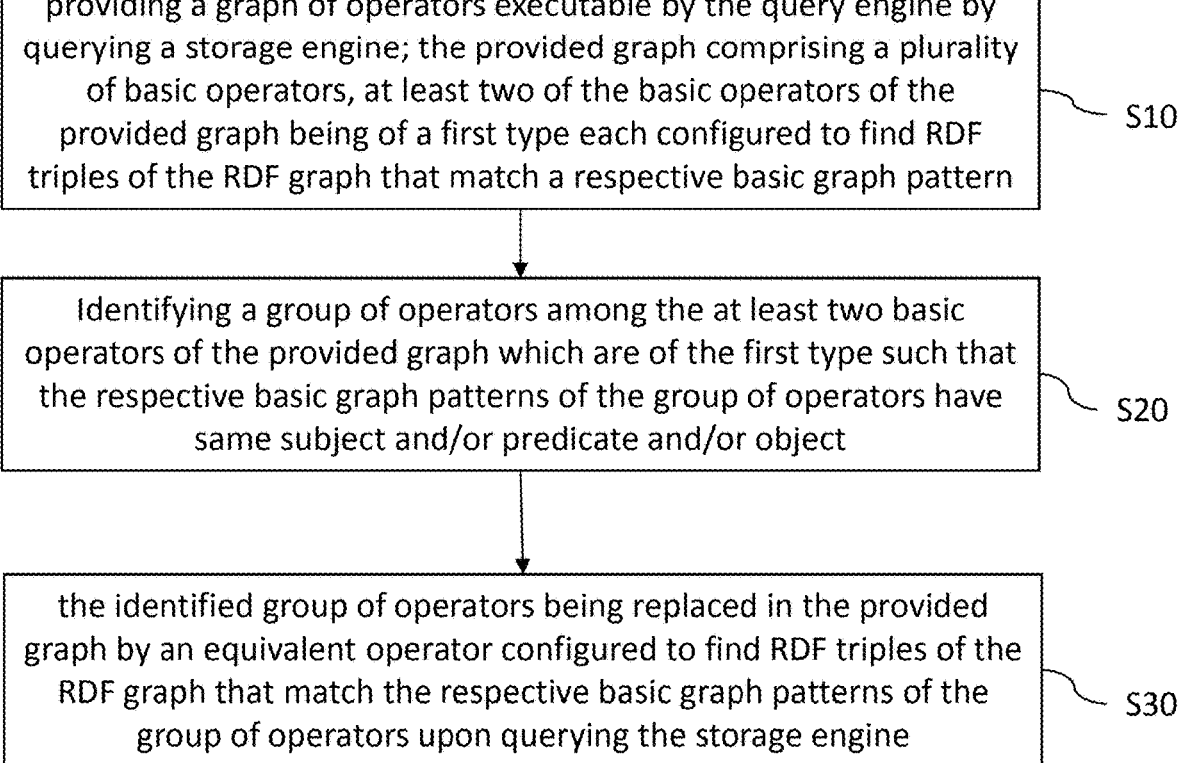

providing a graph of operators executable by the query engine by querying a storage engine; the provided graph comprising a plurality of basic operators, at least two of the basic operators of the provided graph being of a first type each configured to find RDF triples of the RDF graph that match a respective basic graph pattern

S10

Identifying a group of operators among the at least two basic operators of the provided graph which are of the first type such that the respective basic graph patterns of the group of operators have same subject and/or predicate and/or object

S20 the identified group of operators being replaced in the provided graph by an equivalent operator configured to find RDF triples of the RDF graph that match the respective basic graph patterns of the group of operators upon querying the storage engine

OPTIMIZING SPARQL QUERIES IN A DISTRIBUTED GRAPH DATABASE

CROSS-REFERENCE TO RELATED APPLICATIONS

This application claims priority under 35 U.S.C. § 119 or 365 to European Application No. 21306834.9, filed Dec. 17, 2021. The entire contents of the above application(s) are incorporated herein by reference.

TECHNICAL FIELD

The disclosure relates to the field of computer programs and systems, and more specifically to a method, system and program for generating by a query engine a graph (DAG) of operators for a SPARQL query over an RDF graph.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the techniques. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Graph databases are particularly adapted for applications in In-memory databases, i.e., purpose-built databases that rely primarily on memory for data storage, in contrast to databases that store data on disk or SSDs.

As RDF graph databases face the issue of very large datasets and in order to keep the performances and scalability of such databases distributed approach in which data is stored across different physical locations is required. The distribution of data over the physical location may be to optimize some aspects of the database, or response to received queries (e.g., write or read). The distribution is not necessarily known or cannot be enforced.

Three categories of distributed approaches have been proposed:

1. Cloud-based approaches where a large RDF graph is distributed using existing cloud computing platforms (like HDFS—based on small files). These approaches employ a triple pattern-based join processing most commonly using MapReduce techniques (a parallel, distrusted computation) or inspired from it, e.g., with Spark (which is a unified analytics engine for large-scale data processing). Cloud-based approaches have difficulties in adapting MapReduce-like computation to graph computation. MapReduce is basically a split-apply-combine strategy, while SPARQL's graph homomorphism has a much higher semantics.

2. Partition based approaches divide the RDF graph into a set of subgraphs and decompose the SPARQL query into subqueries. Subqueries are executed over the partitioned data using techniques similar to relational distributed databases (see [2] for details on this approach with a relational database). The lack of schemas in RDF (for example the Open World Assumption) makes it difficult to adapt SQL strategies to SPARQL query processing. This approach has difficulty to enforce partitioning strategy as there is no schema in RDF, contrary to relational databases. In particular, the portioning strategy may have been chosen for another purpose (e.g., write throughput).

Both of these approaches result in network chattiness, i.e., increasing the number of intermediate results, which decreases performance.

3. Federated SPARQL processing systems evaluate queries over multiple SPARQL endpoints, typically Linked Open Data target. It is then a data integration approach (i.e., by combining data residing in different sources and providing users with a unified view of them).

Document Peng, et al., "Processing SPARQL queries over distributed RDF graphs.", The VLDB Journal 25.2 (2016): 243-268, proposes techniques for processing SPARQL queries over a large RDF graph in a distributed environment and adopts a partial evaluation and assembly framework. The document proposes a strategy based on only partitioning the data graph but not decomposing the query where an RDF graph is partitioned using some graph partitioning algorithm into vertex-disjoint fragments. Thereby the method requires partitioning the graph and cannot be applied to unknown partitioning.

Within this context, there is still a need for an improved method for generating by a query engine a graph (DAG) of operators for a SPARQL query over an RDF graph.

SUMMARY

It is therefore provided a computer-implemented method for generating by a query engine a graph of operators for a SPARQL query over an RDF graph, the method comprising providing a graph of operators executable by the query engine by querying a storage engine; the provided graph comprising a plurality of basic operators, at least two of the basic operators of the provided graph being of a first type each configured to find RDF triples of the RDF graph that match a respective basic graph pattern; and identifying a group of operators among the at least two basic operators of the provided graph which are of the first type such that the respective basic graph patterns of the group of operators have same subject and/or predicate and/or object, the identified group of operators being replaced in the provided graph by an equivalent operator configured to find RDF triples of the RDF graph that match the respective basic graph patterns of the group of operators upon querying the storage engine.

The method may comprise one or more of the following:
- the respective basic graph patterns of the group of operators have a constant predicate;
- the respective basic graph patterns of the group of operators have a constant object;

the respective basic graph patterns of the group of operators have a same subject;

the provided graph further comprises at least one basic operator of a second type configured to accept one or more RDF triples and a Boolean expression and as input and output a subset of the one or more RDF triples, an application of the Boolean expression on a part of triples of each of RDF triples in the subset being true, the method further comprises moving, prior to the identifying a group of operators among the at least two first type basic operators of the provided graph, each of the at least one basic operator of the second type right after a respective basic operator of the first type, the respective basic operator of the first type being able to find RDF triples which the at least one basic operator of the second type configured to accept; wherein the equivalent operator is further configured to accept as input constraints and the method further comprises, for each of the at least one basic operator of the second type: splitting the operator of the second type into expressions at least partially able to be turned into a set of constraints; and removing the basic operator of the second type from the graph and inputting the set of constraints into a respective equivalent operator that replaces at least the respective basic operator of the first type right before the basic operator of the second type.

each of the constraints is verified by the storage engine and the set of constraints comprises at least one or more of the following: numeric constraints, constraints on type of value or language, and constraints for strings;

the part of triples of each of RDF triples in the subset includes subject and/or object of respective RDF triples;

after the moving each of the at least one basic operator of the second type and before the splitting of operator, for each basic operator of the second type: normalizing the basic operator of the second type into conjunctive form;

the provided graph further comprises at least one basic operator of a third type configured to: accept as input one or more indices each corresponds to a value of an element of variable of an RDF triple in the RDF graph; and output a respective value for the index; wherein the equivalent operator further accepts as input a first tag and the method further comprising, for each of the at least one basic operator of a third type: identifying an equivalent operator in the graph of operators able to find corresponding RDF triples of the operator of the third type; and setting a value of the first tag of the identified equivalent operator to a predefined value and removing the operator of the third type from the provided graph;

at least one of the operators of the group of operators has a second tag for a basic graph pattern, the equivalent operator further accepting as input the second tag, the equivalent operator finding at least any RDF triples of the RDF graph that match the respective basic graph patterns of at least operators in the group of operators without having the second tag;

identifying at least two equivalent operators in the graph of operators having a same subject and/or a same object; and replacing the two identified equivalent operators by an equivalent operator able to find RDF triples of the RDF graph that match the respective identified basic graph patterns of the two identified equivalent operators upon querying the storage engine; and/or

the RDF graph is a distributed RDF graph having an unknown partitioning into two or more subgraphs.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Non-limiting examples will now be described in reference to the accompanying drawings, where:

FIG. 1 shows a flowchart of an example of the method;

DETAILED DESCRIPTION

Figure 2:
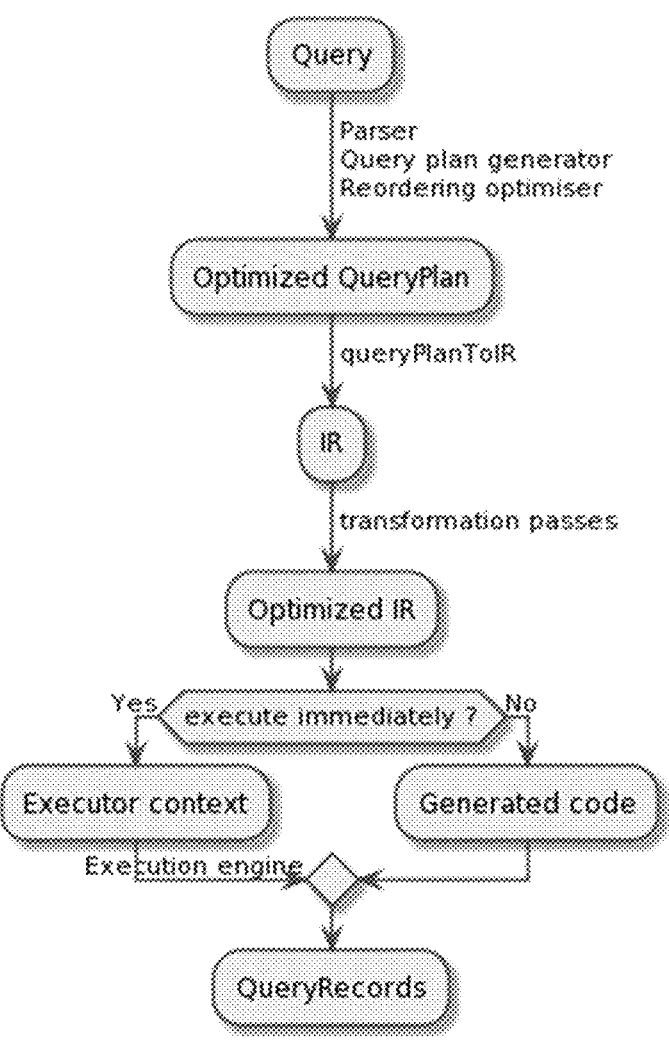
FIG. 2 shows an example workflow of the execution of a SPARQL query inside SPARQL Core.

With reference to the flowchart of FIG. 1, there is described a computer-implemented method for generating by a query engine a graph (i.e., Directed Acyclic Graph or DAG) of operators for a SPARQL query over an RDF graph. The method comprises providing a graph of operators executable by the query engine by querying a storage engine. The provided graph comprises a plurality of basic operators. At least two of the basic operators of the provided graph are of a first type each configured to find RDF triples of the RDF graph that match a respective basic graph pattern. The method further comprises identifying a group of operators among the at least two basic operators of the provided graph which are of the first type such that the respective basic graph patterns of the group of operators have same subject and/or predicate and/or object. The identified group of operators are replaced in the provided graph by an equivalent operator configured to find RDF triples of the RDF graph that match the respective basic graph patterns of the group of operators upon querying the storage engine.

Such a method constitutes an improved solution in engine a graph of operators for a SPARQL query over an RDF graph by optimizing. The optimization is achieved by replacing a group of several operators in the provided graph of the query by an equivalent operator able to find RDF triples of the RDF graph that match the respective basic graph patterns of a group of operators upon querying the storage engine. Such a replacement significantly reduces the communication costs by reducing the overhead of calling the distributed storage engine.

Notably, the method achieves such an optimization without any pre-supposition on how the RDF graph (i.e., collection of data) is distributed across the different physical locations (i.e., on the distribution of data). The method merely requires that the storage engine to be able to answer the query by finding RDF triples of the RDF graph that match a respective basic graph pattern and the partitioning strategy is considered to be unknown.

By "database", it is meant any collection of data (i.e., information) organized for search and retrieval (e.g., a graph-oriented database). As accepted in the art, a graph-oriented database is an object-oriented database using graph theory, therefore with nodes and arcs, allowing data to be represented and stored. The graph relates the data items in the store to a collection of nodes and edges, the edges representing the relationships between the nodes. The relationships allow data in the store to be linked together directly and, in many cases, retrieved with one operation. Graph databases hold the relationships between data as a priority; contrarily to other database models (e.g., relational databases) that link the data by implicit connections. When stored on a memory, the graph database allows a rapid search and retrieval by a computer. Especially, graph databases are structured to for fast retrieval, modification, and deletion of relationships in conjunction with various data-processing operations. Graph-oriented database are also referred to as graph database; the expressions "graph-oriented database" and "graph database" are synonymous.

In examples, the graph database may be an RDF graph database. RDF graphs are a traditional data model used for the storage and the retrieving of graphs. RDF graph is a directed, labeled graph data format. Such format is widely used for representing information in the Web. A standard specification has been published by W3C to specify RDF representation of information as graphs, see for example "RDF 1.1 Concepts and Abstract Syntax", W3C Recommendation 25 Feb. 2014 (or additionally the draft version RDF-star). The core structure of the abstract syntax used is a set of tuples, each comprising a predicate. A set of such RDF tuples is called an RDF graph.

In examples, an RDF tuple may comprise three or four elements comprising nodes and edges. In examples, each RDF tuple (or elements of each RDF tuple) may be a triple comprising a subject, a predicate and an object. In such examples, an RDF graph may be visualized as a node and a directed-arc diagram, in which each triple is represented as a node-arc-node link. Alternatively, an RDF triple may be visualized by two nodes, which are the subject and the object and an arc connecting them, which is the predicate.

In examples, the RDF tuple may be an RDF quad. An RDF quad may be obtained by adding a graph label to an RDF triple. In such examples, an RDF tuple includes the RDF graph. A standard specification has been published by W3C to specify RDF Quads (also referred to as N-Quads), see for example "RDF 1.1 N-Quads, A line-based syntax for RDF datasets", W3C Recommendation 25 Feb. 2014. An RDF quad may be obtained by adding a graph name to an RDF triple. A graph name may be either empty (i.e., for a default or unnamed graph) or an IRI (e.g., a predicate). The graph name of each quad is the graph that the quad is part of in the dataset. Hereinafter, the term RDF tuple (or tuple) indifferently refers to an RDF triple or an RDF quad, unless the use of one or the other is explicitly mentioned.

An RDF graph database may have billions of tuples; for example the Uniprot dataset is a resource of protein sequence and functional information.

Possible optimizations for a query engine of a graph database are impacted by the assumption that the graph database is interacting with an Open World or a Closed World. As accepted per se, in a formal system of logic used for knowledge representation, the open-world assumption (OWA) is the assumption that the truth value of a statement may be true irrespective of whether or not it is known to be true. It is the opposite of the closed-world assumption, which holds that any statement that is true is also known to be true. On the other hand, Closed World Systems require a place to put everything (e.g., slot on a frame, field on an OO class, or column in a DB). OWA assumes incomplete information by default which intentionally underspecifies and allows others to reuse and extend. Semantic Web is a vision of a computer-understandable web which is distributed knowledge and data in a reusable form and RDF, the W3C recommendation for the Semantic Web, follows the Open World Assumption. It allows greater flexibility in data modeling and data storage. Yet the constraints of a Closed World Assumption, as in the relational model with SQL, are useful for query optimizations since they provide more information on how the data is stored.

By "generating a graph of operators for a SPARQL query over an RDF graph", it is meant generation of graph of operators corresponding to a query plan of the SPARQL query. By a "query plan" or "query execution plan" it is meant a sequence of steps used to access data in a SQL relational database management system. As accepted per se, the graph of operators comprises nodes (i.e., vertices) and edges, each node corresponds to an operator in the sequence of the operator and each edge defines the relation between two operators connected by said edge. The graph of operators is a Direct Acyclic Graph (DAG). Hereinbelow, the words DAG and graph may be used interchangeably when applied to operators. As accepted per se such a graph of operators is generated by the query engine.

In examples, the query is a SPARQL query. SPARQL is the W3C recommendation for querying RDF data and is a graph-matching language built on top of triple patterns of RDF triples. SPARQL is a query language for RDF data able to express queries across diverse data sources, whether the data is stored natively as RDF or viewed as RDF via middleware. SPARQL is mainly based on graph homomorphism. A graph homomorphism is a mapping between two graphs that respects their structure. More concretely, it is a function between the vertex sets of two graphs that maps adjacent vertices to adjacent vertices.

SPARQL contains capabilities for querying required and optional graph patterns along with their conjunctions and disjunctions. SPARQL also supports aggregation, subqueries, negation, creating values by expressions, extensible value testing, and constraining queries by source RDF graph. By the triple pattern of RDF triples it is meant RDF triples in which each subject, predicate, or object may be a variable (of query). This means SPARQL queries needs to answer to eight different triple patterns possible in the SPARQL. Such eight triple patterns include (S,P,O), (S,?P, O), (S,P,?O), (S,?P,?O), (?S,P,O), (?S,?P,O), (?S,P,?O), and (?S,?P,?O) in which variables are preceded in the pattern, by the symbol ?. Variables are the output of triple patterns and may be the output of the SPARQL query. In some examples, variables may be the output of a SELECT query. The output of a SPARQL query may be built using the variables (e.g., aggregators like summation). Variables in a query may be used to build a graph homomorphism (i.e., intermediary nodes necessary to get the result of the query). In some examples, variables in a query may be neither used for output nor intermediary result. A Basic Graph Pattern (BGP) may be one of the eight triple patterns. SPARQL may build more complex queries by joining the result of several BGPs and possibly other operators. Thus, competitive SPARQL engines require, at least, fast triple pattern solution and efficient join methods. Additionally, query optimizers are required to build efficient execution plans that minimize the amount of intermediate results to be joined in the BGP.

In examples, the graph database has an existing triple store. A triple store (also referred to as RDF store) is a purpose-built database for the storage and retrieval of triples through semantic queries, as accepted in the art. A triple store can at least answer to the eight basic triple patterns of SPARQL described above. It may also answer to filtering constraints (e.g., "x>5") along with the triples pattern. Such a triple store is considered to be the storage engine on which a SPARQL query is executed by a query engine. A storage engine (also called "database engine") is an underlying software component that a database management system (DBMS) uses to Create, Read, Update and Delete (CRUD) data from a database, as accepted in the art. Additionally, in examples, the triple store is a distributed database. By a "distributed database" it is meant a database in which data is stored across different physical locations, for example by system administrators.

Back to FIG. 1, in step S10, the method comprises providing a graph of operators executable by the query engine by querying a storage engine. By "a graph of operators" it is meant obtaining a graph of operators. In examples, the providing of a graph (DAG) of operators may comprise providing as an input a query plan and transforming the query plan into a DAG of operators. The input query plan may be an optimized query plan by any known method for query plan optimization. In such examples, the input query plan is turned into an Intermediate Representation (henceforward 'IR'), which is a DAG of operators. Providing graph may be obtained by any of standard method in the art. In examples, the RDF graph is a distributed RDF graph having an unknown partitioning into two or more subgraphs. Each of the one or more subgraphs may be stored on a different memory. By an "unknown partitioning" it is meant distribution of the one or more sub-graphs are not available to the method and cannot be enforced. This constitutes an improved solution which enables the method to optimize a query in a scalable manner in a distributed approach and by generating a DAG of operators without knowing or imposing the partitioning in the distribution. For example, such a solution perfectly suits for optimizing query (i.e., read) over a distributed RDF graph where the partitioning strategy is set to optimize other aspect, for example write.

The DAG of operators comprised a plurality of basic operators, at least two of the basic operators of the provided graph being of a first type. By a "basic graph pattern" it is meant is a set of triple patterns as accepted per se from the W3C formal definitions. Most basic operators (such as 'Filter') match one to one with basic SPARQL patterns (such as a FILTER clause) and are straightforward to generate from a query plan. The operator of the first type is configured to find RDF triples of the RDF graph that match a respective basic graph pattern (i.e., a 'Find' operator). The basic graph pattern corresponds to a respective basic operator of the query; in other words, each of the one or more basic operators is configured to execute a basic graph pattern.

Each of the basic operators of the DAG may be executed upon one or more calls by the query engine and consequently may produce streams of tuples, generally grouped in batches called buffers. The buffers may be then consumed by the next operators in the DAG.

Back to FIG. 1, in step S20, the method identifies a group of operators among the at least two basic operators of the provided graph which are of the first type such that the respective basic graph patterns of the group of operators have same subject and/or predicate and/or object. In other words, the method identifies particular pattern in the provided graph of operators.

In examples, the respective basic graph patterns of the group of operators have a constant predicate. Alternatively or additionally, the respective basic graph patterns of the group of operators have a constant object. By "constant predicate/object" it is meant that the group of operators share a predicate/object having a ground value, i.e., the predicate/object is not a variable of the query and has a value specified by the query. Yet, alternatively or additionally, the respective basic graph patterns of the group of operators may have a same subject. One understands that respective basic graph patterns of the group of operators can comprise a constant predicate or a constant object or a same subject, or a constant predicate and a constant object, or a constant predicate and a same subject, or a constant object and a same subject, or a constant predicate and a constant object and a same subject. Limiting the respective basic graph patterns of the group of operators to each of above-mentioned cases (i.e., constant predicate and/or constant object and/or same subject) keep the equivalent operator simple to implement while efficient on the Storage Engine. The method further reduces the number of operators needed to implement various specific patterns that are accepted to appear frequently in SPARQL queries. The optimization for each case is realized in terms of network cost, less data sent to the query engine.

Back to FIG. 1, at step S30, the identified group of operators is replaced in the provided graph by an equivalent operator configured to find RDF triples of the RDF graph that match the respective basic graph patterns of the group of operators upon querying the storage engine. By "replacing" the identified group of operators by an equivalent operator it is meant that the method "updates" the graph of operators by removing the operators belonging to the group from the graph of operators and adding the equivalent operator in the graph of operators. The equivalent operator may be added in place of one of the operators of the group of operators, for example the first operator of the group appears in the provided DAG of the of operators.

In examples, the provided graph further comprises at least one basic operator of a second type. The operator of the second type may be configured to accept one or more RDF triples and a Boolean expression and as input and output a subset of the one or more RDF triples such that an application of the Boolean expression on a part of triples of each of RDF triples in the subset is true. In other words, the operator of the second type is an operator of 'Filter' type and filters input RDF triples (which may be output of another operator in the DAG) based on a Boolean expression as filtering constraint.

In examples, the part of triples of each of RDF triples in the subset includes subject and/or object of respective RDF triples. In other words, when the equivalent operator is followed by an operator of 'Filter' type operator that operates on either the subject and/or object of its input (i.e., includes the subject and/or object of one of the RDF triples), the expressions in the 'Filter' type operator are examined and, if possible, turned into constraints within the equivalent operator.

In examples, the method further comprises moving, prior to the identifying a group of operators among the at least two first type basic operators of the provided graph, each of the at least one basic operator of the second type right after a respective basic operator of the first type. The respective basic operator of the first type is able to find RDF triples which the at least one basic operator of the second type configured to accept. In other words, in such examples the method moves the 'Filter' operators next to the 'Find' operators that could support them as constraints.

In such examples, the identified equivalent operator may be further configured to accept as input constraints and the method further comprises, for each of the at least one basic operator of the second type, splitting the operator of the second type into expressions at least partially able to be turned into a set of constraints. By "splitting the operator" it is meant transforming the operator. The splitting may transform a single operator containing a complex constraint into several operators (all of the same "second type") each containing a simpler constraint. The method may further comprises removing the basic operator of the second type from the graph of operators and inputting the set of constraints into a respective equivalent operator that replaces at least the respective basic operator of the first type right before the basic operator of the second type. Such a replacement further reduces the communication costs by reducing the overhead of calling the distributed storage engine via combining operators of the DAG.

Each of the constraints may be verified by the storage engine. The equivalent operator may apply the constraints on subject and/or object of each RDF triple. The set of constraints comprises at least one or more of the following: numeric constraints (e.g., "equal", "different", "greater than", "less than"), constraints on type of value or language (e.g., English, French, etc.), and constraints for strings (e.g., regular expression (regex) constraint). Additionally or alternatively, the set of constraints may include other constraints (e.g., constraints on dates, etc.). This reduces the amount of data transmitted between the storage engine and the query engine as these constraints are checked by the storage engine and non-conforming outputs are eliminated immediately (i.e., before being sent to the query engine), The method may further comprise, after the moving each of the at least one basic operator of the second type and before the splitting of operator (as discussed above), and for each basic operator of the second type normalizing the basic operator of the second type into conjunctive form. By "conjunctive form" it is meant conjunctive normal form as accepted in the field of Boolean logic. By "normalizing the basic operator" it is meant if the operator contains an expression containing AND, OR and NOT SPARQL operators, then the expression is rewritten as a conjunction of disjunctions of simple expressions (some of which may be negated by a NOT). In examples of normalizing, the method transforms a constraint the shape "(C1 AND C2) OR C3" into "(C1 OR C3) AND (C2 OR C3)". The method may modify all constraints containing Boolean expressions so that the AND operators are brought at the first level of the constraint (this is called "conjunctive form" in the literature). The effect is that it is simpler to split the complex constraint into simple constraints, because OR expressions cannot be split into several operators, whereas AND expressions can. In examples, the provided graph (i.e., DAG) further comprises at least one basic operator of a third type. The basic operator of the third type may be configured to accept as input one or more indices each corresponds to a value of an element of an RDF triple in the RDF graph and output a respective value for the index. An element of an RDF triple may be any of subject, object, or predicated of said RDF triple. In general, each index may correspond to a value of a vertex in the RDF graph, and more specifically to a value in a dictionary, or yet more specifically to a URI or RDF literal from the RDF graph. In other words, the basic operator of the third type may be an operator of 'GetValues'- type as detailed later. Each corresponds to the value of a vertex in the RDF graph" or "each corresponding to a value in the dictionary. As accepted per se, by a "dictionary" it is meant an associative array, map, symbol table, or dictionary is an abstract data type composed of a collection of (key, value) pairs, such that each possible key appears at most once in the collection.

In such examples, equivalent operator may further accept as input a first tag. Additionally, the method may further comprise, for each of the at least one basic operator of a third type identifying an equivalent operator in the graph of operators able to find corresponding RDF triples of the operator of the third type and setting a value of the first tag of the identified equivalent operator to a predefined value and removing the operator of the third type from the provided graph. This enables the method to further reduce the overhead of calling by further combining 'GetValues'- type operators of the provided DAG into the equivalent operator.

In examples, at least one of the operators of the group of operators has a second tag for a basic graph pattern. The second tag may be an 'OPTIONAL' tag as accepted in the SPARQL. The equivalent operator, then may further accept as input the second tag. In such examples, the equivalent operator may find at least any RDF triples of the RDF graph that match the respective basic graph patterns of at least operators in the group of operators without having the second tag. In examples, if a pattern is tagged as "OPTIONAL", then the storage engine returns a first set of triples that matches the non-optional patterns, even if it does not match the optional patterns. In addition, the storage engine returns triples matching an optional pattern and whose subject is also a subject of a triple from the first set. This improves the method in answering the query by the equivalent operator as in the absence of any schema in RDF, models may not guarantee that for a given pattern, triples exist for every expected predicate which necessitates comprising an OPTIONAL clause.

The method may further comprise identifying at least two equivalent operators in the graph of operators having a same subject and/or a same object and replacing the two identified equivalent operators by an equivalent operator able to find RDF triples of the RDF graph that match the respective identified basic graph patterns of the two identified equivalent operators upon querying the storage engine. In other words, the method may combine two already identified equivalent operator. This further reduces the overhead of calling by further combining operators of the DAG of operators.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI); the memory having recorded thereon a computer program comprising instructions for performing the method. The memory may also store a database. The memory is any hardware adapted for such storage, possibly comprising several physical distinct parts (e.g., one for the program, and possibly one for the database).

Figure 6:
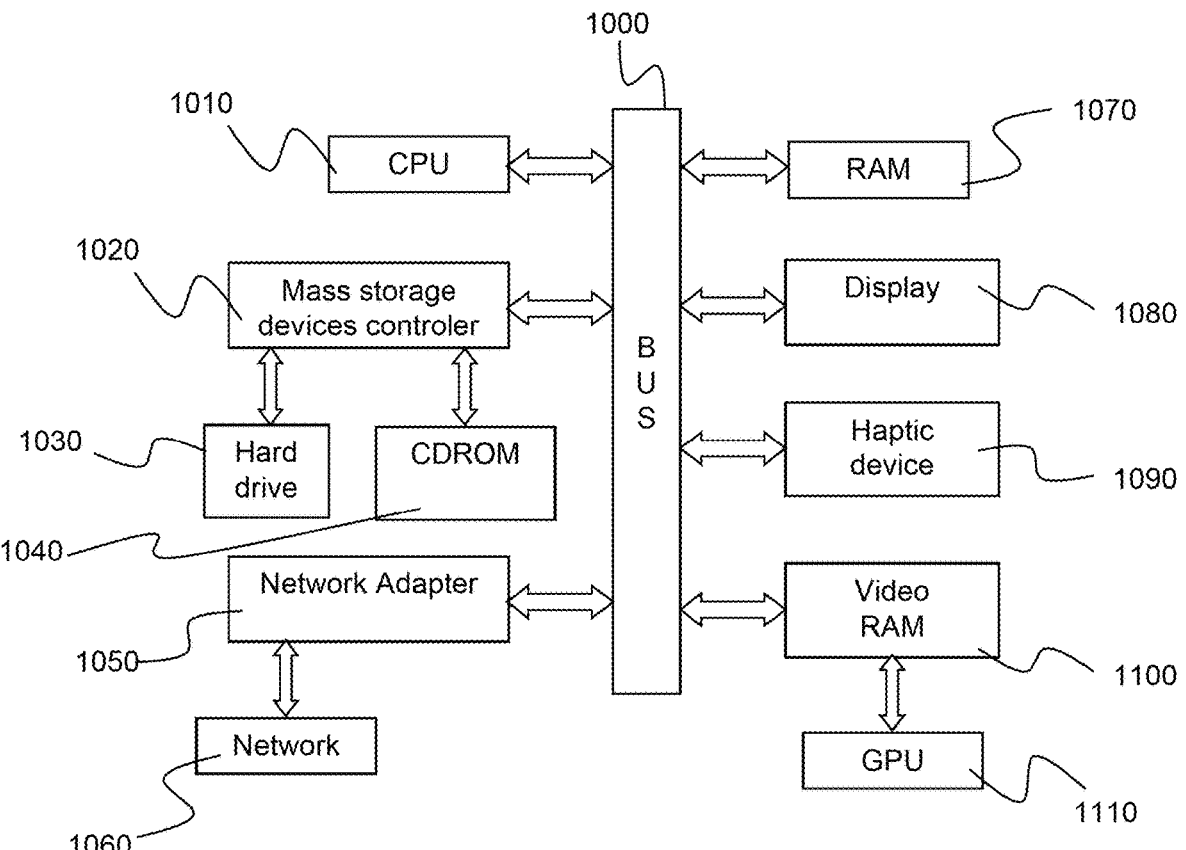
FIG. 6 shows an example of the system.

FIG. 6 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also accepted in the art as frame buffer. A mass storage device controller 1020 manages access to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages access to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Examples of implementation of the hereinabove discussed examples of the method are now discussed.

The examples of implementations are related to the field of SPARQL query optimizers with the aim to minimize the number of intermediate results to be joined. The examples of implementations consider that there exists an existing triple store as discussed above which is a distributed database. The purpose of such a query optimizer is to optimize the query by reducing the communication costs with the underlying triple store, and without any pre-supposition on how the collections of data are distributed across the different physical locations (i.e., on the distribution of data). The considerations for cases where the underlying triple store is not a distributed database are discussed later below.

The examples of implementations are related to the optimization of (the performance of) SPARQL queries with a distributed database with an underlying triple store with an unknown partitioning which cannot be enforced. In other words, the examples of implementations, optimize the performances of SPARQL queries over a distributed RDF storage engine, on which the only requirement is to answer to the eight different triple patterns possible in SPARQL. Partitioning strategy is considered to be unknown. The examples of implementations process the optimization of a SPARQL query inside a query engine called "SPARQL Core". In other words, the examples of implementations refer to the optimization of a SPARQL query inside the SPARQL Core query engine, with the aforementioned triple store.

On a distributed RDF graph, looking for a triple match on a partition and not finding may be seen equivalent to a cache miss. Instead of MapReduce or query partitioning, the examples of implementations create a query plan that group operations together to apply them on a block of triples instead of single triples. For example, graph pattern matching is done on vectors of subjects and/or predicates and/or objects (which can be extended to include graphs as well). Constraints (e.g., filters) may be pushed-down along with these vectors as in classic optimizations (constraints pushed down on table scans in SQL). This results in fewer chattiness on the network, i.e., the network is considered as the resource to optimize, as is the CPU in the main-memory vectorization. In other words, in the examples of implementations, not finding a triple on a partition is considered as the defect to hide, as is the cache miss in main-memory vectorization. The examples of implementations have no requirement on partitioning strategy and does not pull unnecessary data up to the query engine. It is a cloud-based approach fully optimized for graph computation without the drawbacks of a MapReduce-like approach. Thereby, the examples of implementations optimize a query in terms of data sent over the network a SPARQL query in a distributed environment without any requirement on data or graph partitioning of the underlying triple store.

An example workflow of the execution of a SPARQL query inside SPARQL is depicted in FIG. 2. The examples of implementations optimize such an execution from the step of "queryPlanToIR" to "OptimisedIR". The term "IR" stands for "Intermediate Representation" and is inspired by the fact that some query engines are able generate compiled code as intermediate representations in LLVM. The code generation may be performed by any known method in the same spirit of main-memory single-node optimizations as the Vectorization.

Such main-memory optimizations are now discussed.

The examples of implementations are inspired by the query optimization techniques for the execution of a query (or subquery) on a main memory database. An in-memory database (IMDB, also main memory database system or MMDB or memory resident database) is a database management system that primarily relies on main memory for computer data storage. It is contrasted with database management systems that employ a disk storage mechanism. In-memory databases are faster than disk-optimized databases because disk access is slower than memory access, the internal optimization algorithms are simpler and execute fewer CPU instructions. A distributed database may also be a main memory database (e.g., NuoDB).

The prior art for main memory query processing is to execute as few CPU instructions as possible thanks to a technique called vectorization (for example, it is the case for the latest version of NuoDB query engine). In summary, vectorization consists in optimizing CPU and hiding cache miss by executing an operation on a block of tuples instead of just one tuple.

In most query engines, each relational operator is implemented using Volcano-style iteration. While this model worked well in the past when disk was the primary bottleneck, it is inefficient on modern CPUs for in-memory database management systems (DBMSs). Most modern query engines therefore either use vectorization (e.g., VectorWise) or data-centric code generation (e.g., HyPer). Like the Volcano-style iteration model, vectorization uses pull-based iteration where each operator has a next method that produces result tuples. However, each next call fetches a block of tuples instead of just one tuple, which amortizes the iterator call over-head. The actual query processing work is performed by primitives that execute a simple operation on one or more type-specialized columns (e.g., compute hashes for a vector of integers). Together, amortization and type specialization eliminate most of the overhead of traditional engines.

Main-memory vectorization query processing has some drawbacks, as it needs to have all the data in main-memory on a single machine. Thereby, it is not a scalable solution as using such a processing for a distributed query on an RDF graph where the query engine and the data are not necessary on the same machine would require having all the data in cache on a single machine. This method may be possible to use only on the subpart of the query that is executed on only one physical location.

The examples of implementations may have a query plan as input. The input query plan may be optimized, i.e., an "Optimized Query Plan", according to any known method for query plan optimizing. The examples of implementations turn the input query plan into an IR being a Direct Acyclic Graph (DAG) of operators. Alternatively, in some variations, the examples of implementations may have the DAG of operators as input.

The operators in the DAG of operators correspond to basic elements of query execution, i.e., each operator produces streams of tuples, generally grouped in batches called buffers. The buffers of each operator are then consumed by the next operator(s) in the DAG. Operator executions correspond to calls to the underlying triple store, general computations on RDF Terms (i.e., arithmetic, string transformation, etc.) RDF Terms are presented in RDF 1.1 Semantics, W3C recommendation of 25 Feb. 2014.

The DAG of operators is executable by the query engine by querying a storage engine. The Execution is generally multi-threaded. In other words, the tuple buffers may be consumed immediately by the next operator, or queued for execution later on, and may also be "stolen" (i.e., taken over) by another idle thread which then executes the corresponding operators.

The examples of implementations may have an iterative nature and apply several "transformation passes" to the IR to make it more efficient, i.e., to obtain an "Optimized IR" particularly by removing redundant computations, propagating constants, eliminating artefacts of IR generation and reducing the number of operators. For example, the examples of implementations may combine basic triple pattern operators into a single operator with multiple predicates. The examples of implementations may carry out this reduction of the number of operators in order to optimize the communication costs with the underlying triple store.

Thereafter, operators are either decoded and executed by the IR Executor, a multi-threaded "execution engine", or transformed into generated code. The "executor context" or "generated code" outputs a list of "Query Records", which are then passed to SPARQL Core's Query Record Processor.

The Intermediate Representation, or IR, according to implementations, is constituted of the following elements: (i) An operator DAG (Direct Acyclic Graph) which is discussed in detail later below. (ii) A constant table containing all the constant values and indices contained in the IR, so that the IR may refer to them by a simple integer. Hereinbelow, by "an operator contains a constant", it is meant that said operator contains a constant id enable to look up the corresponding constant in the constant table. The examples of implementations use a constant table to avoid storing values several times in the IR DAG itself which may be computationally costly. This improves the examples of implementations by fetching every index corresponding to every value in the constant table (and vice versa) in a single call. (iii) A post-processor parameter corresponding to the content of the SELECT clause in SPARQL, as well as ORDER BY, LIMIT and DISTINCT clauses. SELECT, ORDERBY, LIMIT, and DISTINCT, are well-accepted in SPARQL.

According to the examples of implementations, the operator DAG is a graph of operators whose nodes, called "operators", represent basic operations of the executor. The operator DAG may have a single root (i.e., the beginning of the graph), and a single leaf (i.e., the end of the graph). The single leaf is an emit operator.

The operators in the DAG may manipulate three types of data: indices, values and/or flags.

Indices correspond to indices in a storage engine and are used mainly as the principal inputs and outputs of calls to "IStorageEngine:find". In examples, there exists an 'undefined' index. Values are any RDF value, i.e., blank nodes, URIs, and literals (both typed literals and literals with lang tags), as well as two special values: 'unevaluable', that represents an evaluation error, and 'undef', that represents a variable that has not been bound to any value. In examples, most expression evaluations are done on values, and the eventual result of a query is a list of values. In the examples of implementations, the storage engine provides methods to obtain a value from an index, and vice-versa to obtain indices corresponding to specific value(s). Flags are used by the execution engine to implement synchronization barriers.

The final result of any query execution is a list of tuples of values. The list may be empty if there is no tuple matching the query. The inputs and outputs of each operator are lists of tuples. These tuples may contain zero or more indices, values and flags. The lists of tuples are called buffers and the indices, values and flags are called the "columns" of the buffers while individual tuples of the buffer are called "lines" of the buffer. Columns are defined by their index and their type (index, value or flag). The index of a column is a logical value: it is an identifier rather than a position within the input buffer. The execution engine in the examples of implementations is tasked with mapping the logical values with positions within the buffer. Index and value columns may correspond to a variable in the original query, or to a temporary variable created during IR generation or transformation passes. An index and a value column with the same identifier may correspond to the same logical variable. There may be no correlation between flag columns and index/value columns with the same identifier.

The examples of implementations may execute each operator several times, on a different buffer each time. The examples of implementations may also use a "vectorized" execution engine and may execute each operator on buffers containing several lines. This constitutes an optimized execution by reducing the per-call overhead of individual operator executions and reducing the total number of calls to the storage engine.

The output of any operator is the input of each of children of said operator in the DAG (if any). The input of the root operator is a buffer with a single line with zero columns and the output of the leaf operator is a buffer with columns that are usually all values. The examples of implementations may post-process the output buffer of the leaf operator before tuples are transformed into "QueryRecords" and sent to the "QueryRecordProcesor". The implementations may perform the post-processing by any known methods in the field.

Figure 3:
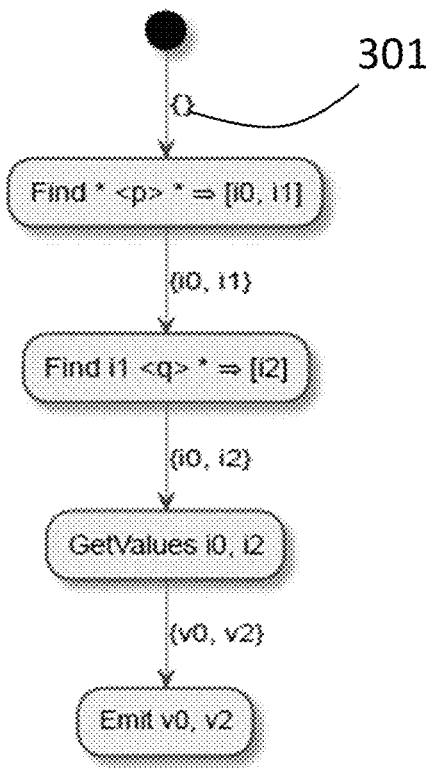
FIG. 3 shows an example of an operator DAG.

A basic example is discussed now in reference to FIG. 3. The following query:

```
SELECT ? a ? c {
    ? a < p > ? b .
    ? b < q > ? c
}
``` is turned into a DAG according to FIG. 3, where i0, i1, . . . correspond to index columns 0, 1, . . . and similarly, v0, v1, . . . correspond to value columns 0, 1, . . . .

Each arrow in FIG. 3 displays the set of columns that are the output of the previous node (which are the input of the next or children operators). The set of input column 301 of the first node is empty by definition. The first "Find" node generates two index columns, i0 and i1 (that correspond to variables ?a and ?b in the original query), and they appear in its output. The second 'Find' node generates a third index column, i2. It also keeps column i0 in its output, because it will be needed later on; however, column i1 is not necessary after this 'Find', and thus is discarded.

The 'Find' nodes correspond to individual BGPs in the original query, and their execution is a call to 'IStorageEngine::find'. Each 'Find' node has a pattern that determines its behavior. For example, the first node finds the indices of all subjects and objects that can fit the pattern '*<p>*' and maps them to index columns i0 and i1. The second 'Find' node uses column i1 as an input, in other words for each of its input lines, it finds every index that match 'I1 <q>*', and, for each answer (if any), outputs a line containing the i0 of the original tuple, and the answer.

The 'GetValues' obtains from the storage the values corresponding to columns i0 and i1, i.e., v0, and v1 and outputs them as value columns. In example of FIG. 3, the 'GetValues' discards i0 and i1 which are not needed afterwards but it keeps them if they are needed later in the query.

The 'Emit' node is always the leaf node of the DAG. It forwards its output to the post-processor. In example of FIG. 3, the post-processor turns the output of 'Emit' node into a list of 'QueryRecords'.

As accepted per se, there exists an 'OPTIONAL' pattern in SPARQL which is a binary operator that combines two graph patterns. The 'OPTIONAL' pattern is any group pattern and may involve any SPARQL pattern types. If the group matches, the solution is extended, if not, the original solution is given. OPTIONAL in SPARQL require a specific treatment in the IR.

Now basic operators in the examples of implementations are discussed.

'Find': this operator has a 'pattern' with three parameters (subject, predicate and object) that may each be a constant, an input column (of type index) or an output column (of type index as well). The input columns, if any CANNOT contain 'undef' indices. This operator corresponds to a call to 'IStorageEngine::find', and may generate zero, one or more lines of output for each line of input.

'GetValues': given one or more index columns, this operator adds the corresponding value columns to the output. It accepts input columns with undefined indices (and returns undefined values in that case).

'GetIndex': this operator is pendant of 'GetValues', i.e., given value columns, it generates corresponding index columns 'Emit': Leaf node of the DAG, passes its input to the post-processor.

'Filter': given an expression that generates a value of type Boolean, a 'Filter' executes the expression on each line and copies the line to its output if and only if the effective Boolean value of the expression is equal to true. Some expressions may further return as values an error instead of Booleans. Error values do not pass a filter.

'CompareIndex': This operator may have a Boolean flag 'equal and given two index columns, copies a line to the output if and only if the two columns are equal (i.e., if 'equal' is true) or different (i.e., if 'equal' is false).

The examples of implementations may comprise another operator, so-called 'StarFind' as described below. The 'StarFind' operator is a new operator with a similar basic premise to 'Find' (wherein given some inputs and a pattern, 'Find' outputs that match the pattern), but with a more complex structure and behavior. In the examples of implementations, the 'StarFind' operator may comprise one or more patterns similar to the pattern of 'Find', with the following properties:

If the one or more patterns comprise more than one pattern, then all patterns have the same subject;

The predicate of each of the one or more patterns be a constant (i.e., not variable); and/or The object of each of the one or more patterns must be a constant or output column.

In addition to mentioned properties, each subject, predicate, or object in any of the patterns may be tagged as requiring a value and/or an index. Alternatively or additionally, the 'StarFind' operator supports a set of constraints that restrict the outputs that it can generate (i.e., a 'Filter').

Semantically, a single 'StarFind' operator according to the examples of implementations corresponds to a combination of several basic operators:

Each pattern corresponds to a Find operator;

The subjects, predicates or objects tagged as requiring a value correspond to a 'GetValues' operator; and/or Each constraint corresponds to a 'Filter' operator. The 'StarFind' operator is implemented by the Storage Engine.

In the examples of implementations, each execution of the 'StarFind' operator on a batch (i.e., a buffer) is thus a single call to the Storage Engine which is equivalent to several calls with basic operators.

The examples of implementations may use 'StarFind' operator with multiple patterns. A recurrent and regular pattern in RDF modeling is a table-like situation where a plurality of subjects, corresponding to individual rows in SQL tables, appear in triples with a restricted set of predicates corresponding to columns in SQL tables. Because of the Open-World assumption, it cannot be assumed that the data from is physically partitioned into tables; nonetheless, it is frequent for SPARQL queries to contain several triples that share the same subject and have constant predicates. For every query with such multiple patterns, a single 'StarFind' operator can be used instead of several Find operator.

The examples of implementations of the 'StarFind' operator may use 'value' tag. As accepted per se, the Find operator finds indexes from the database. Whenever a variable in a SPARQL query is expected to be returned as a result or used in a FILTER or BIND clause (among others), the Find operator must be followed by a 'GetValues' operator for this variable. In practice, almost every query ends with at least one 'GetValues' operator before the Emit operator. In the examples of implementations, the "return value as well as index" tag of 'StarFind' operator renders the 'GetValues' operator unnecessary whenever a StarFind can be used instead of a Find. For many queries, the GetValues operator can be entirely eliminated.

The examples of implementations of the 'StarFind' operator may support a set of constraints that can be applied to subjects and objects of its patterns, such as numeric constraints (e.g., "equal", "different", "greater than", "less than"), constraints on type of value or language, and/or specific constraints for strings (e.g., regular expressions (regex) constraints). The examples of implementations may check these constraints by the Storage Engine and nonconforming outputs are eliminated immediately (i.e., before being sent to the Query Engine). This reduces the amount of data transmitted between the Storage Engine and the Query Engine, often significantly. Additionally, the examples of implementations may leverage constraints by the Storage Engine to optimize data traversal, the same way that e.g., the SQL Schema may be leveraged to optimize the traversal of data in closed-world configurations.

In the examples of implementations, 'StarFind' operator supports having more than one constraint on a subject and/or object. In such examples, the subject and/or object may match every constraint. This is useful to constraint an object to a range of values. Furthermore, 'StarFind' operator may support negating constraints, in which case only objects that do not match the constraint are retained.

The examples of implementations may further optimize the 'StarFind' operator by allowing an "optional" tag. In the absence of any schema in RDF, models often do not guarantee that for a given subject, triples exist for every expected predicate. Therefore, even for "oriented-object" like models, it is frequent for some or all BGPs to be put inside an OPTIONAL clause. In the examples of implementations, 'StarFind' allows an "optional" tag on each pattern. In such examples of implementations, if a pattern is tagged as "optional", then the Storage Engine returns any subject that matches the non-optional patterns, even if it does not match the optional patterns; and if a triple that matches an optional pattern is present, it must return it as well. In other words, 'StarFind' supports the equivalent of an OPTIONAL clause containing a single BGP.

The examples of implementations of 'StarFind' may apply some restrictions in supported patterns. In other words, the 'StarFind' may not support every pattern that may be found in a query. In particular, as stated above, 'StarFind' may require that every predicate within its patterns be a constant. Such restrictions keep 'StarFind' sufficiently simple to implement efficiently on the Storage Engine. The purpose of StarFind is not to execute complete queries on the Storage Engine but to reduce the number of operators needed to implement very specific patterns that are accepted to appear frequently in SPARQL queries.

Thereby, the examples of implementations optimize the performances of SPARQL queries over a distributed RDF graph where the partitioning strategy cannot be enforced, for example when the partitioning strategy has been chosen to optimize the write performances and is subject to change. The examples of implementations consider the partitioning strategy as unknown. In particular, the examples of implementations optimize the generation of the IR to minimize the cost of the distributed Storage Engine without enforcing any partitioning strategy.

In order to obtain such an optimization, the implementations define a new 'StarFind' operator able to replace several basic operators. The implementations further optimize the generation of the IR to create as 'StarFind' operators as much as possible, with vectors of subjects and/or predicates and/or objects. Additionally, the examples of implementations attach Constraints and/or GetValues to the StarFind operators.

Examples of optimized IR generations for a SPARQL query according to examples of implementations are now discussed.

The IR may be first generated in a non-optimized form that contains only basic operators. The query may be first parsed into an Abstract Syntax Tree, which may optionally be optimized by reordering some of its elements or eliminating trivially useless constructs (such as a FILTER(TRUE) clause in the query). This possibly optimized syntax tree is called Query Plan.

Most basic operators (such as 'Filter') match one to one with basic SPARQL patterns (such as a FILTER clause) and are straightforward to generate from the query plan. However, the IR may have two additional constraints (compared to SPARQL patterns):

'Find' operators in the IR may distinguish variables that are outputs to the operator (i.e., not appeared earlier in the query plan) from those that are inputs (i.e., were outputs in an operator that appeared earlier in the query plan). This is different from graph patterns in SPARQL (and in the query plan) which may accept variables that may or may not have received values from previous operators. In this case, the graph of operators may contain two branches, one for the case where the variable is an input, and one for the case where it is an output.

The 'Find' operators in the IR may only retrieve indexes from the dictionary and if a subsequent operator requires the corresponding value (to the retrieved indexes), then a 'GetValues' operator may be inserted before that operator (to obtain the corresponding values). Additionally, a 'GetValues' operator may be necessary for any variable appearing in the SELECT clause of the SPARQL query.

In the examples of implementations, a single branch of the Query Plan may correspond to several branches in the IR. For example, given a query with a UNION node generates a variable ?a in one branch but not in another, and then a BGP where the same variable ?a appears, the IR may contain two 'Find' operators for this single BGP: one corresponding to the first branch of the UNION where the variable ?a is an input, the other corresponding to the second branch of the UNION where variable ?a is an output.

The examples of implementations comprise an algorithm implemented by SPARQLCore to minimize the number of duplicate patterns while as much as possible while keeping an O(n) complexity in number of traversed nodes of the Query Plan. The examples of implementations only require the generation algorithm to generate an IR that respects the two following constraints:

> If several branches lead to a 'Find' operator containing a variable ?x, then either all of those paths generate that variable ?x, or none do; and
>
> If any operator (like 'Filter') needs to read the value of a variable, then a 'GetValues' node appears before that operator to generate the value from the index provided by 'Find' operators.

The algorithm that generates the IR from the Query Plan may be any algorithm known in the field. Several of such algorithms are available in prior art with various compromises between the quality of the generated IR, the simplicity of the algorithm, and the execution time of the algorithm.

An example of IR generation algorithm of SPARQLCore is now discussed.

As discussed above, the IR may be generated from the Query Plan, which is a modified syntax tree, by the function queryPlanToIR. Nodes in the Query Plan are called Graph Patterns. To generate the DAG with as few nodes as possible while abiding by the DAG rules, queryPlanToIR may implement a frontier-based algorithm.

As discussed above, a "column" may either be the index of a variable, or the value of a variable. 'Find' operators generate index columns for a variable, whereas 'GetValues' operators generate a value column from an index column. 'queryPlanToIR' may traverse the Query Plan by a depth-first search algorithm as accepted per se. At any step of the traversal, it may maintain the list of all the branches that are currently being generated in the DAG, and for each branch, the set of all columns that have been generated by operators in that branch. This list of branches is called the frontier. The algorithm then analyses the GraphPattern it is traversing, appends some operators to the branches, and generates new frontiers from the appended operators.

If two branches in the frontier have the same set of defined columns, then the next step of the algorithm is going to append identical operators to them, and it is thus possible to merge the two branches. More largely, two branches can be merged if, for each column present in any of the two branches:

> the column is not read by any TriplePattern later in the query; or
>
> the column is either defined in both branches, or undefined in both branches.

Columns that are read "later" in the query are called decisive columns. The set of decisive columns for each Graph Pattern can be computed in a single pass before the beginning of queryPlanToIR, thus keeping an O(n) complexity.

Thereby, the complete algorithm to traverse a GraphPattern is as the following:

> Obtain the set of decisive variables for the current GraphPattern;
>
> Find every branch in the frontier that has the same set of decisive columns by computing a bitmap describing whether each decisive column is present in a branch, and using this bitmap as a key in a hash table; and
>
> For every set of branches with a given set of decisive columns:
>> generate a new list of operators corresponding to the GraphPattern and this set of decisive columns,
>>
>> append the head of this list of operators to each of these branches, and
>>
>> add the tail of the list to a new frontier.

Examples of mapping of GraphPatterns to operators are now discussed.

For a TriplePattern the examples of implementations may generate a single 'Find' operator, where every variable of the TriplePattern becomes an input if it is defined in the GenerationContext, and an output otherwise.

For a FilterPattern the examples of implementations may generate a 'GetValues' operator if any variable appearing in the filter expression has a corresponding index column in the GenerationContext but no value column, and then a 'Filter' operator containing the expression in bytecode form.

For a OptionalPattern the examples of implementations may generate an 'Optional' operator with a new flag, generate the content of the optional clause (corresponding to the 'Optional' operator) with the current GenerationContext, and append a 'SetFlag' operator. The examples of implementations may further add the tail of this branch to the new frontier and add the second child of the 'Optional' operator to the frontier with the OptionalPattern's original GenerationContext.

Some types of operators (for example, 'StarFind' as discussed above) are not generated from GraphPatterns and instead are generated by transformation passes that simplify and optimize the IR DAG.

Examples of transformation passes and optimizations are now discussed.

In the examples of implementations, the IR DAG data structure provides functions to help with traversal and modifications of the DAG. These functions may be used to implement several transformations or check passes. Additionally, the transformation passes may be a 'StarFind' operator generation pass.

In the examples of implementations, the generation of 'StarFind' operators proceeds in several passes. First, a reordering (i.e., moving) pass moves every 'Filter' operator to right after the last 'Find' operator that generates variables contained in that 'Filter' operator, if possible. In other words, this step brings the 'Filter' operators next to the 'Find' operator that could support them as constraints. Next, every 'Filter' operator is normalized into conjunctive form; in other words, if 'Filter' contains an expression containing AND, OR and NOT SPARQL operators, then the corresponding expression of 'Filter' is rewritten as a conjunction of disjunctions of simple expressions (some of which may be negated by a NOT). The 'Filter' operator is then split (i.e., transformed) into the expressions that can be turned into constraints and those that cannot. The 'Filter' operator may not be split if it is already a simple expression able to be turned into a constraint without splitting.

Next, 'Find' operators with a constant predicate and an output or constant object are turned into a 'StarFind' operator with a single pattern. If the new 'StarFind' is followed by a Filter that operates on either its subject or object, the expressions in the Filter are examined and, if possible, turned into constraints within the 'StarFind'. Likewise, if the 'StarFind' operator appears within the nodes corresponding to an Optional clause, then those nodes are removed and the pattern in the StarFind is tagged as "optional". Then, successive 'StarFind' operators in the graph of operators are examined. If they have the same subject, they are merged by combining their patterns and the constraints on their subjects. Finally, another pass finds every 'GetValues' operator and walks up the graph to determine if variables inside the 'GetValues' operator were generated by a 'StarFind' operator. In that case, the variable is eliminated from the 'GetValues' operator and a tag is added to the 'StarFind' operator to indicate that it should return the value as well as the index of the corresponding variable.

An IRExecutor is the interpreter for implementation of vectorized in an execution engine. In other words, given an IR, the IRExecutor interprets and executes the IR on multiple threads and generates a query response in the form of QueryRecords.5.6.13. IRExecutor may be according to any known methods in the field.

Figure 4:
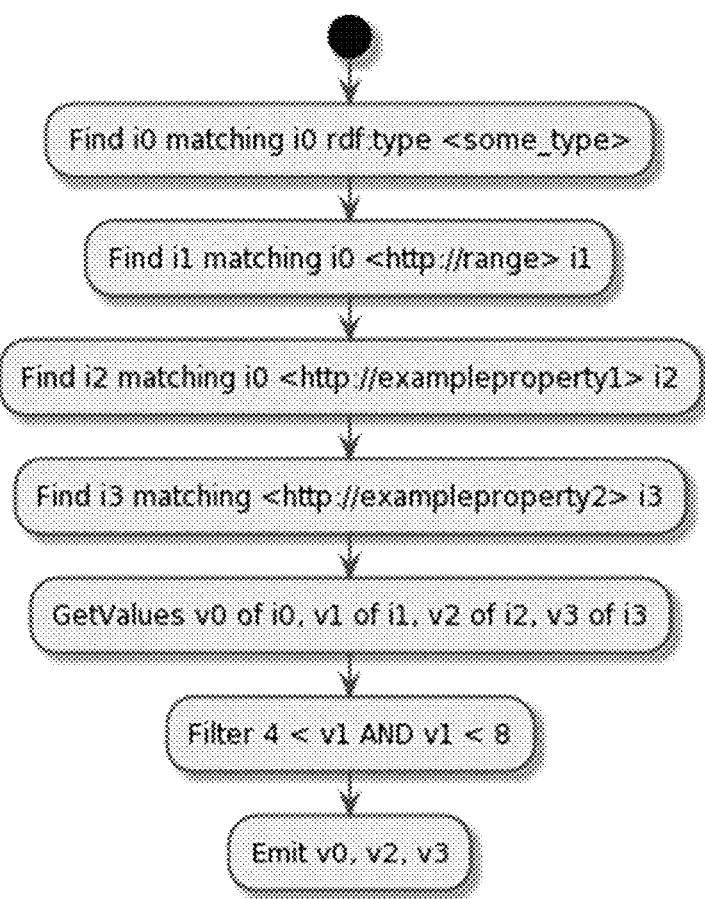
FIG. 4 shows another example of an operator DAG.
Figure 5:
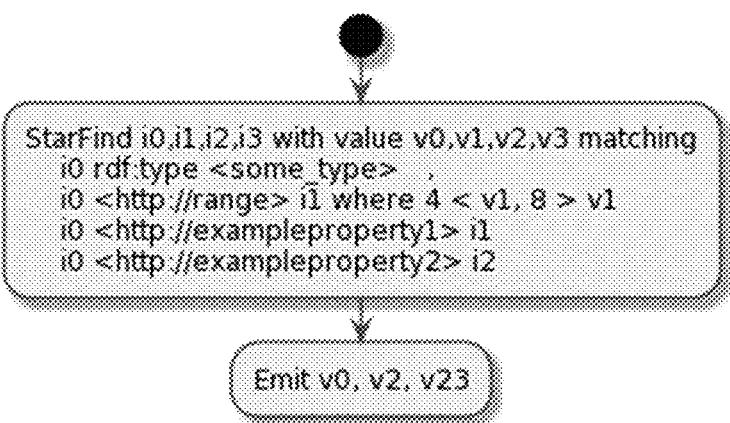
FIG. 5 shows an example an operator DAG generated by the method.

An example application of the examples of implementations to a query is now discussed in reference to FIGS. 4 and 5.

Let's take as an example the following query:

```
SELECT ? x ? y ? z WHERE {
    ? x rdf: type < some_type > .
    ? x < http://range > ? r .
    ? x < http://exampleproperty1 > ? y .
    ? x < http://exampleproperty2 > ? z .
    FILTER (4 < ? r AND ? r < 8) .
    }.
```

The graph of operators of the query according to prior art is as FIG. 4 in which ach 'Find' and 'GetValues' operator corresponds to one call per batch to the storage engine. Assuming a query short enough to necessitate only one batch, this implies 5 calls to the storage engine.

With the disclosure, the graph of operators is as follow: The graph of operators according to the examples of implementations is as FIG. 5. As it can be seen from this figure, the number of operators that require individual calls to the storage engine has decreased to 1, thus reducing significantly the overhead of calling the distributed storage engine. Moreover, intermediate data that would round-trip between each operator and the query engine does not need to transit through the query engine thanks to the 'StarFind' operator defined in the examples of implementations. This reduces significantly the network cost of the query.

The invention claimed is:

1. A computer-implemented method for reducing an overhead of calls sent by a query engine to a storage engine, the query engine generating at least one graph of operators corresponding to a query execution plan of a SPARQL (SPARQL Protocol and RDF Query Language) query over a Resource Description Framework (RDF) graph, the RDF graph being distributed over different physical locations and having a partitioning into two or more subgraphs, the partitioning being not available to the method, the query execution plan being a sequence of steps to access data in a SQL (Structured Query Language) relational database management system, the method comprising:

obtaining, by the query engine, a graph of operators executable by the query engine, each executable operator being in correspondence with at least one respective call for querying the storage engine, the obtained graph of operators including a plurality of basic operators, at least two of the basic operators of the obtained graph being of a first type each configured to find RDF triples of the RDF graph that match a respective basic graph pattern without knowing or imposing the partitioning of the RDF graph; and reducing data transmitted between the query engine and the storage engine by:

identifying, by the query engine, a group of operators among the at least two basic operators of the obtained graph of operators which are of the first type such that respective basic graph patterns of the group of operators have same subject and/or predicate and/or object, replacing the identified group of operators in the obtained graph of operators by an equivalent operator, querying the storage engine with a single call corresponding to the equivalent operator, finding, based on the querying of the storage engine, RDF triples of the RDF graph that match the respective basic graph patterns of the group of operators, and accessing, using the RDF triples, data in the SQL relational database management system.

2. The method of claim 1, wherein the respective basic graph patterns of the group of operators have a constant predicate.

3. The method of claim 2, wherein the respective basic graph patterns of the group of operators have a constant object.

4. The method of claim 2, wherein the respective basic graph patterns of the group of operators have a same subject.

5. The method of claim 2, wherein the obtained graph of operators further includes at least one basic operator of a second type configured to accept one or more RDF triples and a Boolean expression and as input and output a subset of the one or more RDF triples, an application of the Boolean expression on a part of triples of each of RDF triples in the subset being true, wherein the method further comprises:

moving, prior to the identifying a group of operators among the at least two basic operators of the first type of the obtained graph of operators, each of the at least one basic operator of the second type right after a respective basic operator of the first type, the respective basic operator of the first type being able to find RDF triples which the at least one basic operator of the second type is configured to accept, and wherein the equivalent operator is further configured to accept as input constraints and the method further comprises, for each of the at least one basic operator of the second type:

splitting the basic operator of the second type into expressions at least partially able to be turned into a set of constraints; and removing the basic operator of the second type from the graph of operators and inputting the set of constraints into a respective equivalent operator that replaces at least the respective basic operator of the first type right before the basic operator of the second type.

6. The method of claim 1, wherein the respective basic graph patterns of the group of operators have a constant object.

7. The method of claim 6, wherein the respective basic graph patterns of the group of operators have a same subject.

8. The method of claim 6, wherein the obtained graph of operators further includes at least one basic operator of a second type configured to accept one or more RDF triples and a Boolean expression and as input and output a subset of the one or more RDF triples, an application of the Boolean expression on a part of triples of each of RDF triples in the subset being true, wherein the method further comprises:

moving, prior to the identifying a group of operators among the at least two basic operators of the first type of the obtained graph of operators, each of the at least one basic operator of the second type right after a respective basic operator of the first type, the respective basic operator of the first type being able to find RDF triples which the at least one basic operator of the second type is configured to accept, and wherein the equivalent operator is further configured to accept as input constraints and the method further comprises, for each of the at least one basic operator of the second type:

splitting the basic operator of the second type into expressions at least partially able to be turned into a set of constraints; and removing the basic operator of the second type from the graph of operators and inputting the set of constraints into a respective equivalent operator that replaces at least the respective basic operator of the first type right before the basic operator of the second type.

9. The method of claim 1, wherein the respective basic graph patterns of the group of operators have a same subject.

10. The method of claim 9, wherein the obtained graph of operators further includes at least one basic operator of a second type configured to accept one or more RDF triples and a Boolean expression and as input and output a subset of the one or more RDF triples, an application of the Boolean expression on a part of triples of each of RDF triples in the subset being true, wherein the method further comprises:

moving, prior to the identifying a group of operators among the at least two basic operators of the first type of the obtained graph of operators, each of the at least one basic operator of the second type right after a respective basic operator of the first type, the respective basic operator of the first type being able to find RDF triples which the at least one basic operator of the second type is configured to accept, and wherein the equivalent operator is further configured to accept as input constraints and the method further comprises, for each of the at least one basic operator of the second type:

splitting the basic operator of the second type into expressions at least partially able to be turned into a set of constraints; and removing the basic operator of the second type from the graph of operators and inputting the set of constraints into a respective equivalent operator that replaces at least the respective basic operator of the first type right before the basic operator of the second type.

11. The method of claim 1, wherein the obtained graph of operators further includes at least one basic operator of a second type configured to accept one or more RDF triples and a Boolean expression and as input and output a subset of the one or more RDF triples, an application of the Boolean expression on a part of triples of each of RDF triples in the subset being true, wherein the method further comprises:

moving, prior to the identifying, a group of operators among the at least two basic operators of the first type of the obtained graph of operators, each of the at least one basic operator of the second type right after a respective basic operator of the first type, the respective basic operator of the first type being able to find RDF triples which the at least one basic operator of the second type is configured to accept, and wherein the equivalent operator is further configured to accept as input constraints and the method further comprises, for each of the at least one basic operator of the second type:

splitting the basic operator of the second type into expressions at least partially able to be turned into a set of constraints; and removing the basic operator of the second type from the graph of operators and inputting the set of constraints into a respective equivalent operator that replaces at least the respective basic operator of the first type right before the basic operator of the second type.

12. The method of claim 11, wherein each of the constraints is verified by the storage engine and the set of constraints includes at least one or more of the following:

numeric constraints, constraints on type of value or language, and constraints for strings.

13. The method of claim 11, wherein the part of triples of each of RDF triples in the subset includes subject and/or object of respective RDF triples.

14. The method of claim 11, further comprising, after the moving each of the at least one basic operator of the second type and before the splitting of the basic operator, for each basic operator of the second type:

normalizing the basic operator of the second type into conjunctive form.

15. The method of claim 1, wherein the obtained graph further comprises at least one basic operator of a third type configured to:

accept as input one or more indices each corresponding to a value of an element of variable of an RDF triple in the RDF graph, and output a respective value for the one or more indices; and wherein the equivalent operator further accepts as input a first tag and the method further comprises, for each of the at least one basic operator of a third type:

identifying an equivalent operator in the graph of operators able to find corresponding RDF triples of the operator of the third type; and setting a value of the first tag of the identified equivalent operator to a predefined value and removing the operator of the third type from the obtained graph.

16. The method of claim 1, wherein at least one of the operators of the group of operators has a second tag for a basic graph pattern, the equivalent operator further accepting as input the second tag, the equivalent operator finding at least any RDF triples of the RDF graph that match the respective basic graph patterns of at least one or two operators in the group of operators without having the second tag.

17. The method of claim 1, further comprising:

identifying at least two equivalent operators in the graph of operators having a same subject and/or a same object; and replacing the two identified equivalent operators by an equivalent operator able to find RDF triples of the RDF graph that match the respective identified basic graph patterns of the two identified equivalent operators upon querying the storage engine.

18. A non-transitory computer readable storage medium having recorded thereon a computer program that when executed by a computer causes the computer to implement a method for reducing an overhead of calls sent by a query engine to a storage engine, the query engine generating at least one graph of operators corresponding to a query execution plan of a SPARQL (SPARQL Protocol and RDF Query Language) query over a Resource Description Framework (RDF) graph, the RDF graph being distributed over different physical locations and having a partitioning into two or more subgraphs, the partitioning being not available to the method, the query execution plan being a sequence of steps to access data in a SQL (Structured Query Language) relational database management system, the method comprising:

obtaining, by the query engine, a graph of operators executable by the query engine, each executable operator being in correspondence with at least one respective call for querying the storage engine, the obtained graph of operators including a plurality of basic operators, at least two of the basic operators of the obtained graph being of a first type each configured to find RDF triples of the RDF graph that match a respective basic graph pattern without knowing or imposing the partitioning of the RDF graph; and reducing data transmitted between the query engine and the storage engine by:

identifying, by the query engine, a group of operators among the at least two basic operators of the obtained graph of operators which are of the first type such that respective basic graph patterns of the group of operators have same subject and/or predicate and/or object, replacing the identified group of operators in the obtained graph of operators by an equivalent operator, querying the storage engine with a single call corresponding to the equivalent operator, finding, based on the querying of the storage engine, RDF triples of the RDF graph that match the respective basic graph patterns of the group of operators, and accessing, using the RDF triples, data in the SQL relational database management system.

19. A system comprising:

a processor coupled to a memory, the memory having recorded thereon a computer program for reducing an overhead of calls sent by a query engine to a storage engine, the query engine generating at least one graph of operators corresponding to a query execution plan of a SPARQL (SPARQL Protocol and RDF Query Language) query over a Resource Description Framework (RDF) graph, the RDF graph being distributed over different physical locations and having a partitioning into two or more subgraphs, the partitioning being not available to the method, the query execution plan being a sequence of steps to access data in a SQL (Structured Query Language) relational database management system, that when executed by the processor causes the processor to be configured to:

obtain, by the query engine, a graph of operators executable by the query engine, each executable operator being in correspondence with at least one respective call for querying the storage engine, the obtained graph of operators including a plurality of basic operators, at least two of the basic operators of the obtained graph being of a first type each configured to find RDF triples of the RDF graph that match a respective basic graph pattern without knowing or imposing the partitioning of the RDF graph, and reduce data transmitted between the query engine and the storage engine by the processor being configured to:

identify, by the query engine, a group of operators among the at least two basic operators of the obtained graph of operators which are of the first type such that respective basic graph patterns of the group of operators have same subject and/or predicate and/or object, replace the identified group of operators in the obtained graph of operators by an equivalent operator, query the storage engine with a single call corresponding to the equivalent operator, find, based on the querying of the storage engine, RDF triples of the RDF graph that match the respective basic graph patterns of the group of operators, and access, using the RDF triples, data in the SQL relational database management system.

* * * * *